United States Patent [19]
Schissler

[11] 3,848,144
[45] Nov. 12, 1974

[54] ACOUSTIC DELAY SURFACE WAVE MOTION TRANSDUCER SYSTEMS

[75] Inventor: Lloyd R. Schissler, Jamaica Plain, Mass.

[73] Assignee: Sperry Rand Corporation, New York, N.Y.

[22] Filed: Apr. 11, 1973

[21] Appl. No.: 350,274

[52] U.S. Cl. ............... 310/8.1, 73/517 R, 310/8.4, 310/8.5, 310/9.8, 333/30 R
[51] Int. Cl. ............................................. H01v 7/00
[58] Field of Search ............... 310/8.4, 8.5, 8.6, 9.7, 310/9.8, 8.1; 333/30 R; 73/71, 517 R, 517 A, 517 AV, DIG. 4; 330/5.5

[56] References Cited
UNITED STATES PATENTS

| | | | |
|---|---|---|---|
| 3,023,627 | 3/1962 | Geyling | 73/517 R |
| 3,233,466 | 2/1966 | Shaw, Jr. | 310/8.4 X |
| 3,479,536 | 11/1969 | Norris | 310/8.5 |
| 3,572,109 | 3/1971 | Yerman | 73/517 R X |
| 3,701,147 | 10/1972 | Whitehouse | 333/30 R X |
| 3,723,915 | 3/1973 | Adler et al. | 333/30 R |

*Primary Examiner*—J. D. Miller
*Assistant Examiner*—Mark O. Budd
*Attorney, Agent, or Firm*—Howard P. Terry

[57] ABSTRACT

Transducer devices employing relative changes in the acoustic propagation characteristics of waves of the Rayleigh type flowing along polished surfaces of a thin elastic member yield a measure of the degree of flexing or surface strain of the elastic member, which latter may take the form, for instance, of a cantilever beam. Signal processing circuits supply outputs proportional to strain and free of mode locking and other spurious interactions of oscillatory circuits that include the surface wave delay elements.

15 Claims, 10 Drawing Figures

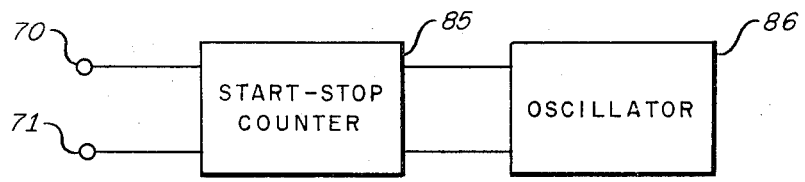
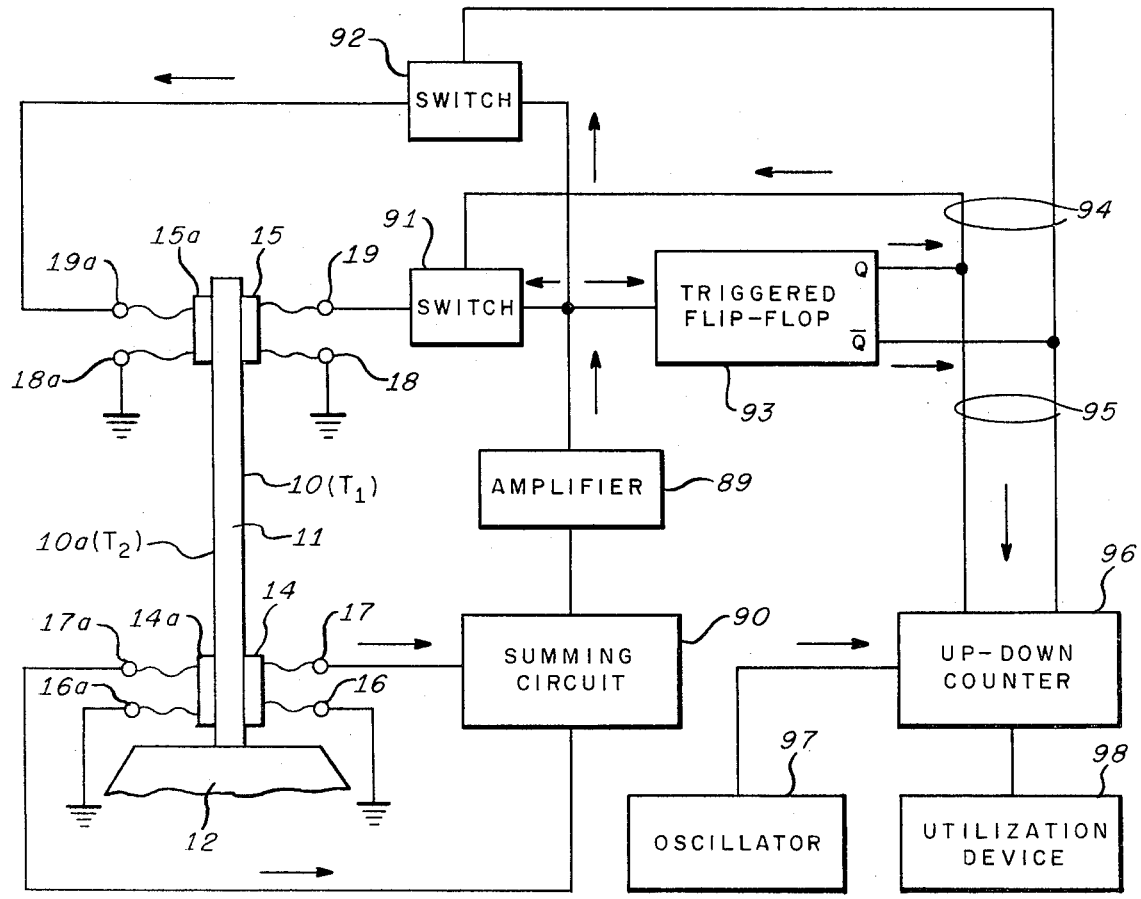
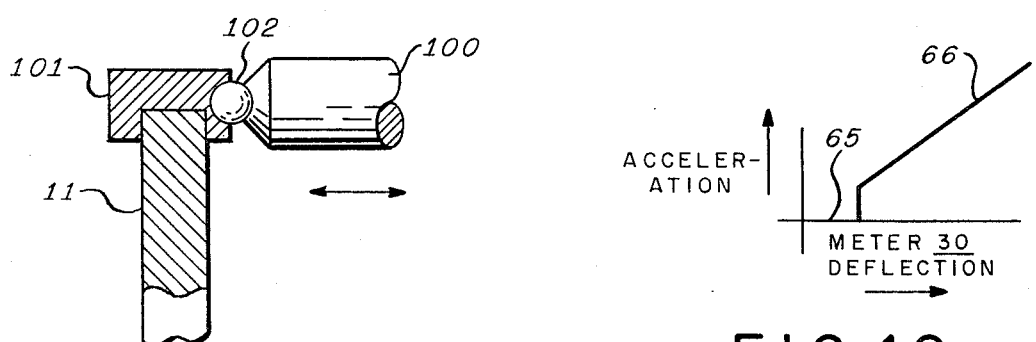

3,848,144

ACOUSTIC DELAY SURFACE WAVE MOTION TRANSDUCER SYSTEMS

BACKGROUND OF THE INVENTION

1. Field of the Invention

The invention pertains to sonic transducer devices employing surface acoustic waves adapted for use in the measurement of strain, displacement, acceleration, force, or related parameters and more particularly relates to transducers utilizing relative changes of the velocity of propagation of acoustic surface waves and of the effective light of flexible elements constituted of materials, for example, of the piezoelectric or ferroelectric kinds.

2. Description of the Prior Art

Generally, prior art accelerometer and other displacement or strain measuring devices encompass a wide variety of structures and principles. Each approach has been found to have its particular merits, but many defects are also present, such as lack of sensitivity and reliability on the one hand, and fragility and high cost on the other. Some accelerometer arrangements, for example, require expensive auxiliary equipment, such as feed back mechanisms for providing reliable calibration or constant temperature enclosures. Many such prior art arrangements are inherently analog in nature and do not lend themselves directly to use in digital processors.

The prior art includes a variety of piezoresistor transducers, including direct stress transducers of the kind employing a flexible cantilever clamped at one end to which acceleration or physically applied forces are directed at the unclamped end for flexing the cantilever. In these transducers, the basic structural member (the cantilever) does not contribute greatly to the sensitivity of the apparatus, merely transmitting the stress to be measured to a more sensitive sensor element such as a piezoresistor affixed to a flexing surface of the cantilever. Measurement of current flow through such resistors yields a measure of strain of the cantilever. Such devices are, however, expensive and difficult to manufacture and strict controls must be exercised in order that the product be uniform. Further, adhesives used to affix the resistors do not demonstrate reliability. Since resistivity of an exposed resistor element is to be measured by measuring flow of electrical current through it, the devices are sensitive to changing ambient temperature and humidity conditions. Strict maintenance of calibration requires many special precautions. Furthermore, the devices are inherently analog in nature and are best suited for application when the associated display or other utilization device is an analog device. Such measurement devices generally demonstrate troublesome zero drift and scale factor drift with variations in temperature and in power supply voltage and may therefore demonstrate significant warm up drifts and continued instability after that initial period.

SUMMARY OF THE INVENTION

The present invention relates to strain, motion, force, or acceleration transducing devices employing surface propagating acoustic waves on flexible elements, such as waves of the Rayleigh type. Measurements are made of the relative changes in the time of propagation of the surface sonic wave as the flexible element is displaced by the forces to be measured. Devices of this general nature have been described by H. B. Matthews, H. van de Vaart, and J. C. Worley in the U.S. Pat. application Ser. No. 300,034 for "Acoustic Delay Surface Wave Motion Transducers," filed Oct. 24, 1972 and assigned to Sperry Rand Corporation. The present invention provides novel signal processing systems for improving the operation and precision of the transducers of U.S. Pat. application Ser. No. 300,034 by making them more fully independent of spurious effects of undesired signal coupling between oscillatory channels of the transducer systems.

BRIEF DESCRIPTION OF THE DRAWINGS

FIGS. 6, 7, and 8 are circuits alternative to that of FIG. 5.

FIG. 9 is a partial elevation view of one form of apparatus for applying forces for flexing the transducer.

FIG. 10 is a graph useful in explaining the operation of the invention.

DESCRIPTION OF THE PREFERRED EMBODIMENTS

The motion transducer employed in the present invention utilizes changes in the propagation characteristics of acoustic waves flowing at the surface of a relatively thin elastic or flexure member to provide output signals yielding measures of the degree of flexure of the elastic member. Accordingly, the transducer may be used in the present invention to detect relative motion between parts of the flexing elastic member, whether induced by direct acceleration of parts of the flexible member itself, or whether induced by directly communicated mechanical forces, as in conventional strain gauges or other such transducer devices.

Figure 1:
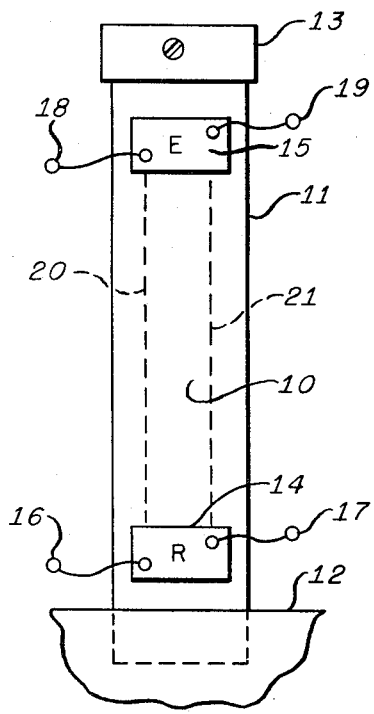
FIG. 1 is an elevation view of a preferred form of the transducer.
Figure 2:
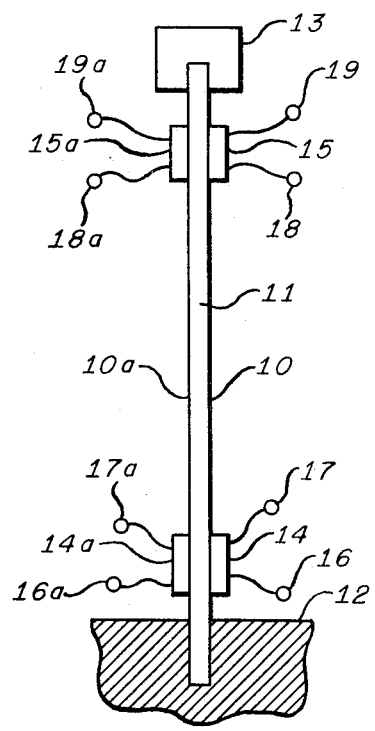
FIG. 2 is a side view of the transducer of FIG. 1.

As seen in FIGS. 1 and 2, the transducer employs the propagation of a surface elastic plane wave at a predetermined boundary surface 10 of a clamped elastic cantilever or flexure member 11. The cantilever flexure device 11 is clamped in a conventional manner with a base element 12. Cantilever 11 will normally have a thin cross section of elongate or rectangular shape, thus affording a preferred flexure direction and little sensitivity to forces applied at right angles to the thin dimension. Depending upon the selected design acceleration, when operated as an accelerometer, for instance, the cantilever may have a seismic mass 13 clamped at its end opposite base 12.

Waves of the Rayleigh type may be used in the device; with Rayleigh waves, the particle motion at the boundary surface 10 is miniscule and retrograde elliptical; i.e., components of particle displacement exist both in the direction of energy propagation and normal to the boundary surface plane. The surface acoustic wave velocity is slightly less than the bulk elastic wave velocity often employed in prior art elastic transducer devices. The acoustic energy of the preferred wave flows almost entirely within a thin layer at surface 10 and is closely bound to that surface. The propagation velocity is substantially independent of the carrier frequency of the wave.

The surface acoustic waves are accompanied by propagating synchronous alternating traveling electric and magnetic fields which extend somewhat into free space above the boundary surface 10. Quartz, piezoelectric semiconductors, and ferroelectric materials, as well as other materials, demonstrate such surface wave propagation.

Excitation of the running surface acoustic wave may be accomplished by generating a compatible running electric field wave at the surface boundary of the medium on which the surface waves are to propagate. Similarly, for magnetostrictive materials, the surface wave may be excited by presenting a time varying magnetic field at the boundary surface. Various methods of generation of such surface waves have been described in the literature. The same principles as are employed for exciting the waves may generally be used to convert the waves back into electrical signals, as will be seen.

In FIGS. 1 and 2, the element 15 represents an exciter for exciting acoustic surface waves flowing along the idealized path defined by dotted lines 20, 21 at the surface layer 10 of the transducer. An electrical driving signal applied to the flexible lead terminals 18, 19 is converted by exciter 15 into Rayleigh waves which may be collected by receiver element 14, wherein the acoustic signals are re-converted to electrical signals appearing at the flexible lead output terminals 16, 17. It will readily be seen by those skilled in the art that the functions of exciter 15 and receiver 14 may be interchanged as a matter of design choice.

It will be seen that, if the top of cantilever 11 is moved to the left in FIG. 2, the distance between exciter 15 and receiver 14 is increased; therefore, an increased time is taken for the acoustic signal to flow between elements 14 and 15. Conversely, if the top of cantilever 11 of FIG. 2 is moved to the right, the surface 10 of the cantilever is compressed and the distance between exciter 15 and receiver 14 is diminished. Therefore, the acoustic signal arrives at receiver 14 in a shorter time than in the previous situation. Since, in some materials, propagation velocity may change upon flexing, the delay may increase or decrease with strain. In any event, an alternating motion of the seismic mass 13 produces a signal delay at output terminals 16, 17 which is modulated in time in proportion to the vibration amplitude of the mass. It will be seen that a measure of the deflection of cantilever 11 may be made in several ways, as is taught in the aforementioned pending U.S. Pat. application Ser. No. 300,034.

In the form of the transducer preferred for use in the present invention, an arrangement is used of surface wave systems inherently immune to ambient temperature conditions when operated with appropriate signal processing circuits. Paired surface wave paths 10, 10a are now formed as seen in FIG. 2 on opposed sides of the flexure cantilever 11, path 10 being associated with exciter 15 and receiver 14 and path 10a with exciter 15a and receiver 14a. It will be seen that movement to the left of mass 13 causes path 10 to stretch, while path 10a is compressed by a substantially equal amount, and vice versa. If the temperature of cantilever 11 changes, the respective at-rest distances or transit times between elements 14, 15 and 14a, 15a change substantially equally. If a signal processing circuit is used in which the effective total delays are subtracted one from the other, the spurious delays induced by temperature change are substantially cancelled.

Figure 3:
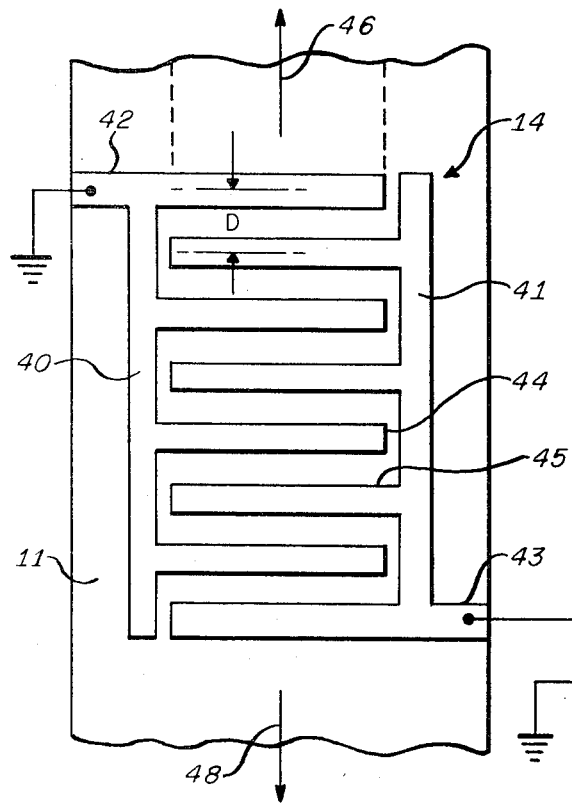
FIG. 3 is an elevation view of an acoustic driver or receiver device which may be used in transducers such as that of FIGS. 1 and 2.

While several types of surface wave exciters and receivers are available in the prior art, one arrangement which may be used is illustrated in FIG. 3. By way of example, the exciter device of FIG. 3 consists of a pair of electrodes 40 and 41 with respective interdigital fingers of alternating instantaneous polarity, such as the respective fingers 44 and 45. Standard photoetching and photoresist masking or other techniques may be used to fabricate the thin conductors of the interdigital electrodes 40 and 41, which electrodes may be made of aluminum or other electrically conducting material, and may have widths of the order of microns depending upon the design frequency. Adjacent fingers of any one electrode, such as fingers 44 of electrode 40, are spaced substantially one wave length apart at the operating carrier frequency. The electrode device 40, 41 acts in a manner analogous to an end fire antenna array, propagating the desired forward surface wave in the direction indicated by arrow 46 when driven by signals passing through a conventional matching network 47 from a source of electrical current oscillations.

Figure 4:
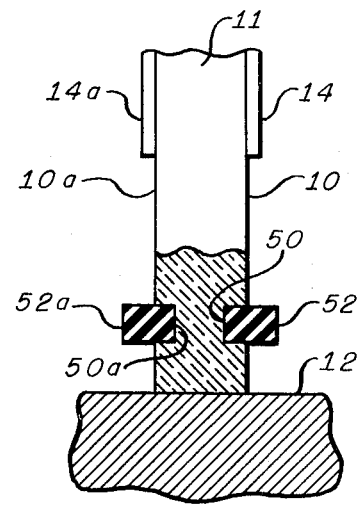
FIG. 4 is a view, partly in cross section, of a detail of an absorber structure which may be used in the apparatus of FIGS. 1 and 2.

If generation of a reverse wave as indicated by arrow 48 may not be tolerated, this wave energy may be absorbed in a convenient acoustically matched absorber. For example, an end layer of conventional acoustic absorbing material, such as wax or rubber or dielectric tape may be used. Since the major portion of the acoustic energy in the surface wave is bound to a layer including the surface 10 and the substrate to a depth of about one wave length below surface 10, the surface wave may be absorbed as in FIG. 4 by milling or otherwise forming transverse slots 50, 50a in the respective opposite propagation surfaces 10, 10a between the exciters and the base 12, and by filling the slots with acoustic absorbers 52, 52a composed of wax, rubber, or other suitable material. Slots 50, 50a are grossly exaggerated in size in the figure merely for convenience in illustrating them.

An advantage of the construction is that the surface wave exciter when placed, for instance, at base 12, launches surface waves traveling only away from the clamped support region at base 12, and the nature of the clamped region has substantially no effect on wave propagation, substantially no echoes being produced.

Since the law of reciprocity evidently applies to the exciter 15 of FIG. 3, a similarly constructed electrode system may act as a receiver 14, coupling to the traveling electric field associated with the surface elastic wave, and thereby yielding a useful electrical output for signal processing.

The interdigital electrodes in FIG. 3 may be connected to cooperating circuits by fine gold wires fastened by standard thermocompression techniques to the electrodes at points 42, 43 or by solder. The exciter and receiver elements may be shielded, if desired, by small shields (not shown) designed to reduce mutual electromagnetic coupling between input and output electrodes.

In operation, the exciter electrode system 15 of FIGS. 1 through 4 interacts with the quartz, lithium niobate, bismuth germanate, or lithium germanate substrate that forms the cantilever flexure element 11, producing the two oppositely running surface acoustic waves 46, 48 flowing at right angles to the electrode fingers 44, 45. Adjacent fingers of electrodes 40, 41 are preferably spaced apart by an integral number of half wave lengths. The traveling wave is successively amplified as it passes under each pair of adjacent electrode fingers. The receiver electrode system 14 is similarly constituted and readily operates in the reverse sense to re-convert the acoustic wave into a delayed electrical output signal. In both cases, it is preferred in the interest of efficiency to space the electrode fingers so that the condition of acoustic synchronism obtains, the traveling electric field at the exciter, for example, having the same periodicity as the electric field normally bound to the acoustic wave. For this condition, D in FIG. 3 is one half wave length.

The configurations of the transducer thus far discussed have in common the attribute that either the exciter or receiver element is located at a movable end of the flexible element 11, making necessary the use at that end of flexible leads such as the leads of terminals 18, 19 in FIGS. 1 and 2. It will be understood that the present invention may employ other of the forms of the transducers described in the previously mentioned U.S. Pat. application Ser. No. 300,034, such as those in which both the exciter and receiver electrode systems are located at the clamped end of the flexure member or cantilever 11. Thus, there are present no electrical connections at the free end of the cantilever flexure member 11 which might in some circumstances adversely affect operation of the invention. An acoustic reflector is placed adjacent the free end of the cantilever 11, the exciter and receiver elements 15 and 14 being disposed side-by-side near the base 12 of the device. The surface wave generated by exciter 15 is reflected back by the reflector into receiver 14.

Figure 5:
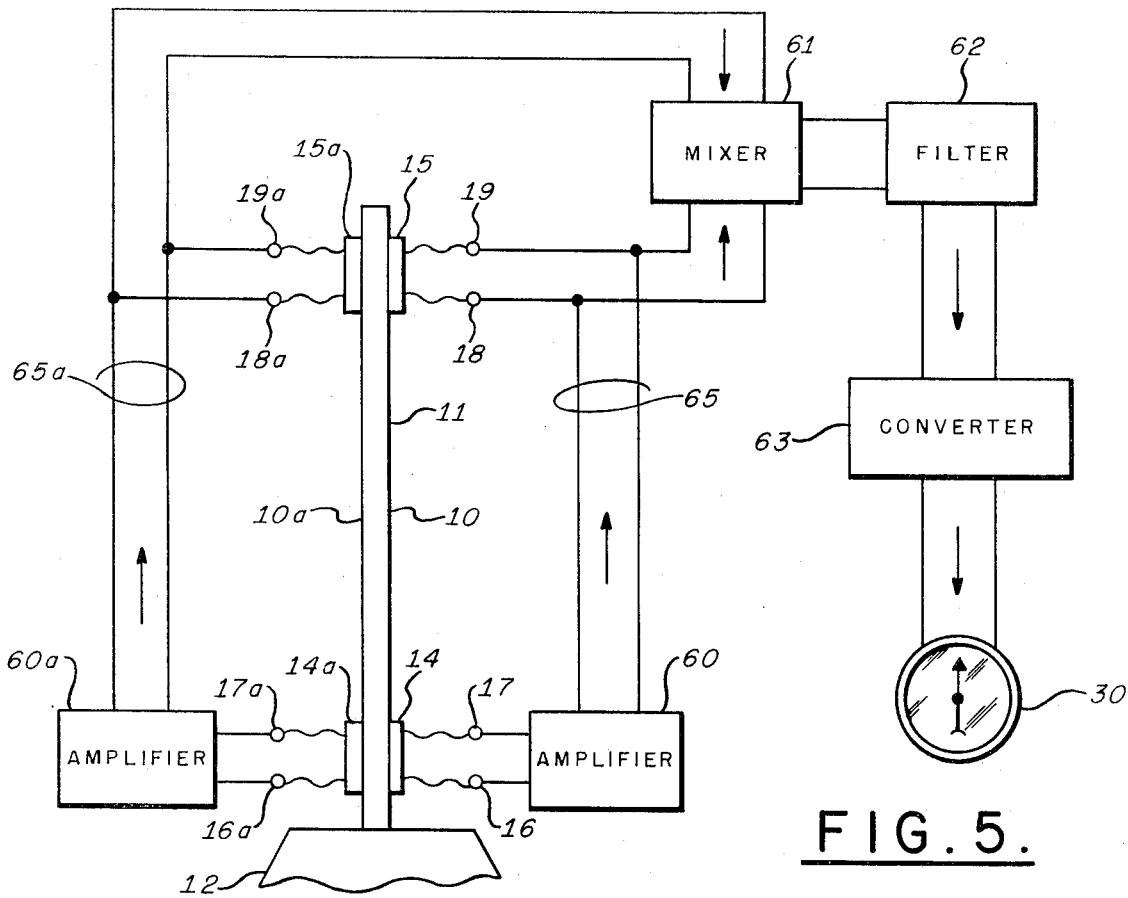
FIG. 5 is a circuit diagram of one form of signal processing and display circuit generally useful with embodiments of the invention such as that of FIGS. 1 and 2.

In describing the present invention, it will be convenient first to discuss the structure and operation of the basic transducer and signal processor system illustrated in FIG. 5. In FIG. 5, a motion transducer system employing a flexure cantilever element 11 corresponding to that of FIGS. 1, 2, and 3 is illustrated. Feed back amplifier 60 supplies exciter 15 with a carrier signal via terminals 18, 19 for generating a surface wave along surface 10 then picked up by receiver 14, whose electrical output is coupled via terminals 16, 17 to an input of amplifier 60. The output of receiver 14 is seen to be coupled via feed back leads 65 in frequency determining relation to the input of amplifier 60 in a circuit having an inherent frequency of sine wave oscillation. Because of the feed back connection 65, the amplifier circuit will oscillate at a frequency such that the phase shift around the loop 14, 60, 15, 14, is an odd multiple of 180°.

The cantilever flexure element 11 of FIG. 5 is further equipped, as in FIGS. 1 and 2, with an exciter 15a and receiver 14a associated with the second surface path 10a. Amplifier 60a is used to drive exciter 15a. The carrier acoustic wave, in traversing the surface path 10, has its phase varied upon arrival at receiver 14a if the flexure cantilever 11 is flexed. The frequency of oscillation will adjust itself so that the original phase shift of 180° is restored. The frequency of the electrical signal generated by receiver 15 is beat or heterodyned in mixer 6 with that from receiver 15a, to produce an output beat frequency signal. Filter 62 may be used to pass the difference beat frequency, for example, readily excluding the sum signal also present in the output of mixer 61. The output of filter 62 is subjected to the action of a conventional frequency-to-unidirectional current converter 63. The amplitude of deflection of electrical meter or other display 30 is then proportional to the magnitude of the unidirectional current developed by converter 63, accordingly being proportional to the magnitude of deflection of cantilever flexure member 11.

In the system of FIG. 5, each surface wave delay device is used as the primary determinant of the natural sine wave oscillation frequency of an associated oscillatory circuit including gain. The basic or at rest system oscillation frequency $f_s$ is:

$$f_s = 1/2(T + t_o)$$

(1)

where T is the delay time of each of the surface delay elements 10 and 10a and $t_o$ is essentially the delay time through each of the amplifiers 60, 60a. This is the lowest frequency such that the phase delay through the line and amplifier is 180°. It will be understood that the loops can also readily be designed to oscillate at any odd multiple of frequency $f_s$. Thus, the oscillation frequency can be at any frequency $(2N+1)f_s$, where N is an integer. This feature beneficially permits setting the design scale factor of the device at a high value and obtains greater measurement resolution in a given counting time. In the preferred form of the invention, the delay inherent in amplifiers 60, 60a is made as small as possible so that the operating frequency depends very little upon the nature of the amplifiers.

Figure 6:
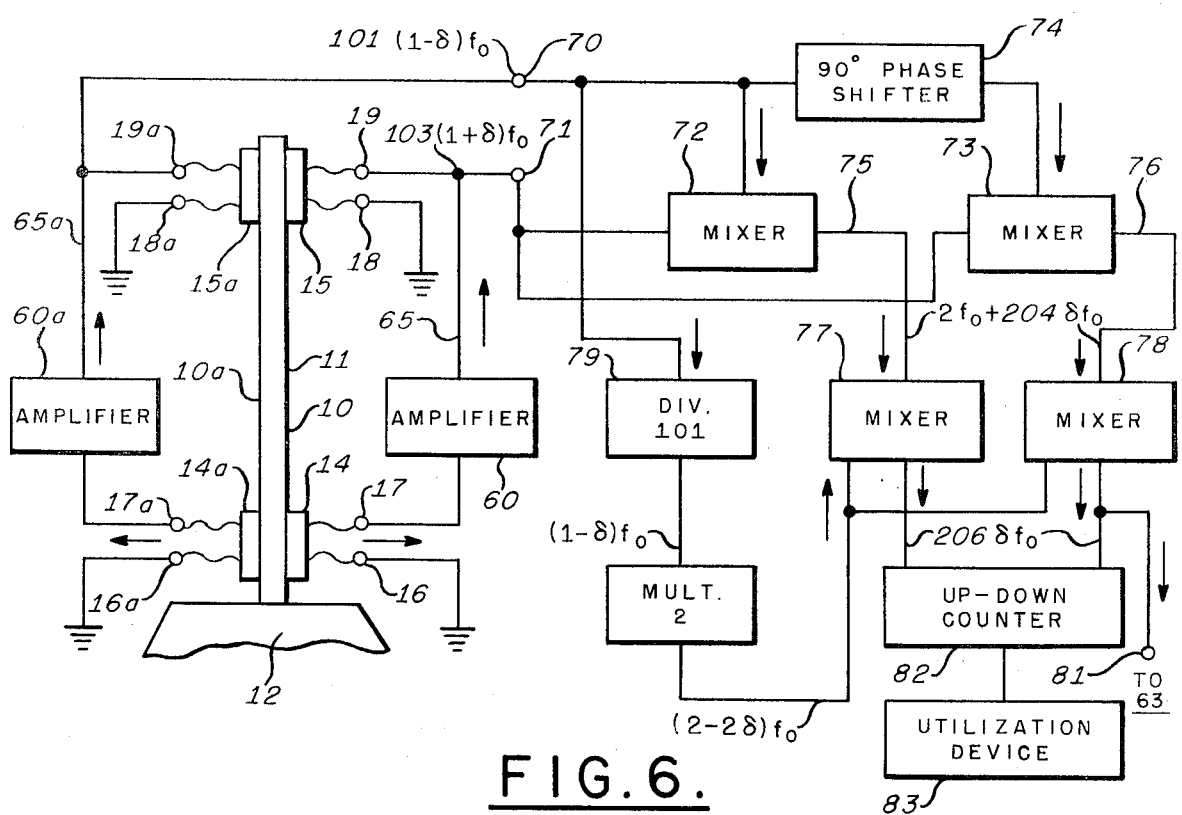

The configuration of FIG. 6 corrects for a defect present in the basic system of FIG. 5 whose presence is disadvantageous in many operating conditions, though not in some. In the arrangement of FIG. 5, the two oscillatory circuits respectively associated with amplifiers 60, 60a will normally operate at the same frequency under zero strain conditions. In this situation, a condition presents itself which has often been observed when two presumably independent oscillatory circuits operate at or near the same frequency when in relatively close proximity. Unfortunately, there will generally be some kind of stray coupling between the otherwise independent oscillator circuits, such as stray capacitive or inductive coupling, coupling through the finite impedance of a common power supply, or the like. In the present flexure element 11, there is also the possibility of a small, but finite, undesired interaction of surface or other acoustic waves running at the otherwise independent surfaces 10, 10a. An important source of difficulty may be undesired capacitive coupling of electrodes such as electrodes 15, 15a on opposite sides of the dielectric flexure element 11.

The undesired effects of mode locking between otherwise independent oscillators have been discussed extensively in the literature in technical papers of general scope and particularly in patents and the other literature dealing with the ring laser sensor. For the present purposes, it will therefore suffice to observe that the aforementioned types of coupling in the FIG. 5 apparatus will cause the two oscillators, as their operating frequencies approach one another, to mode lock when an arbitrarily small frequency difference is reached. The oscillators continue in the mode locked state over a band of frequency differences from zero back to the arbitrary value at which mode locking was initiated. As seen in the graph of FIG. 10, there will therefore be a region 66 in which the deflection of meter 30 is usefully proportional to acceleration. In a small, but finite region 65 near zero, the proportionality disappears and only the qualitative information is conveyed that the actual acceleration lies somewhere in the region 65.

In the embodiment of FIG. 6, an arrangement for overcoming the mode locking problem is illustrated. The flexure element 11 and its associated elements including amplifiers 60, 60a, and connections 65, 65a are the same as shown in FIG. 5, corresponding reference numerals being employed in the two figures. However, the oscillators are caused to run at two different odd multiples of the frequency $f_s$.

The oscillatory circuits activated by the respective amplifiers 60, 60a are adjusted under operating conditions to run at two different frequencies that are multiples of $f_s$, a frequency which varies as the sensor is accelerated. For example, assume that the oscillator associated with amplifier 60 operates in use at the frequency $(2N-1)f_s$ and that using amplifier 60a operates in use at $(2N+1)f_s$. If the integer N is 51, for example, then the operating frequencies with no strain are 101 $f_s$ and 103 $f_s$. The numbers 101 and 103 are each prime numbers, as well as being relatively prime, and many such prime number pairs exist that are separated by two. Under these conditions, the interaction between the two oscillators averages to zero over many cycles, and no mode locking takes place. It will be seen that a frequency separation of 2 $f_s$ is sufficient always to prevent mode locking. The two frequencies of any such pair evidently can still be referred to the same scale in the signal processor system by frequency multiplication and division. The separation of the frequencies of oscillation of the two oscillatory circuits is thus an even multiple of $f_s$ at zero strain; it must be larger than the data bearing frequency shifts due to the strain or acceleration to be measured. In practice, the data bearing shifts are quite small in comparison, for example, to 2 $f_s$. Should a large shift occur in a particular application, it will readily be seen that larger even multiples of $f_s$ may satisfactorily be used ($4f_s$, $6f_s$, or greater).

A system employing these principles is illustrated in FIG. 6, where the output of the $(2N-1)f_s$ oscillator appears at terminal 70 and the output of the $(2N+1)f_s$ oscillator appears at terminal 71, terminals 70 and 71 being respectively coupled to the outputs of amplifiers 60a and 60. For ease in illustrating an example, assume that the surface path 10 has been lengthened by a fractional value δ, so that its associated oscillator runs at frequency $(2N-1)(1-δ)f_s$ or 101 $(1-δ)f_s$. For the same reason, assume that surface path 10a has been shortened by the same fractional value δ, so that its associated oscillator runs at frequency $(2N-1)(1+δ)f_s$ or 103 $(1+δ)f_s$. These frequencies are indicated in FIG. 6 at terminals 70, 71.

The signals at terminals 70 and 71 are used as inputs in the dual input port mixers 72 and 73, the signal on terminal 70 having first been subjected to 90° phase shifter 74. Mixers 72 and 73 may be conventional double balanced mixers producing sum and difference frequency outputs. The difference frequency outputs may be selected by filters within the respective mixers and appear on output leads 75 and 76. These signals are of the same frequency $2f_s + 204δf_s$, though they are in quadrature phase relation because of the effect of 90° phase shifter 74. They serve as one set of inputs to the respective dual port mixers 77 and 78.

A signal serving as a reference frequency is coupled to the second input ports of mixers 77 and 78. The reference frequency is derived from the frequency $101(1-δ)f_s$ found at terminal 70, since it has a lower value than the frequency of the signal on terminal 71. In practice, either the signals on terminals 70 or 71 may be used. The terminal 70 signal (of frequency $101(1-δ)f_s$) is divided by the quantity 101 in a conventional divider 79 to yield an output signal of frequency $(1-δ)f_s$. For purposes which will be seen, the $(1-δ)f_s$ signal is then doubled in frequency by a conventional multiplier 80, yielding a signal of frequency $2(1-δ)f_s$ which is coupled to second inputs of mixers 77, 78. The difference frequency outputs of mixers 77 and 78 are both of frequency $202δf_s$, but are in phase quadrature. Both output frequencies are directly proportional to the strain or acceleration experienced by flexure member 11. Either output may therefore be coupled, as from terminal 81, to the converter 63 of FIG. 5 and displayed on meter 30. The sign of the phase difference between the two outputs indicates the sense of the acceleration. The quadrature variable frequency outputs of mixers 77 and 78, when they represent acceleration, may be supplied as inputs to a conventional up-down counter 82 used to control utilization devices such as a computer or display. The count accumulated in the up-down counter 82 at any time represents the velocity of the accelerometer, since accumulation of the count is analogous to integration. Alternatively, up-down counter 82 may inherently incorporate its own conventional display for displaying actual velocity of the accelerometer sensor. It will be recognized that the quadrature channel, including elements 73, 74, and 78, fulfills the need for providing an output from which reversal of the sense of acceleration may be sensed. For instance, in the instance in which it is desired to measure only positive accelerations, the quadrature channel is not required. The single output would then be a frequency proportional to acceleration, as in FIG. 5.

In the system of FIG. 6, mode locking is prevented by separating the data bearing signals in the frequency domain. It is also possible to prevent the mode locking interaction by separating the occurrence of the signals in the time domain as basically illustrated in FIG. 7, wherein the input terminals are to be coupled to output terminals 70 and 71 of FIG. 6. The system of FIG. 7 would preferably use broad band amplifiers 60, 60a, broad band exciters 15, 15a, and broad band receivers 14, 14a so that circulating pulses in the two loops, once traveling therein, would maintain their integrity as sharp, short duration pulses. One can imagine the presence of such recirculating pulses by assuming that they are initiated in the two loops by momentarily connecting a pulse generator to them through OR gates and then withdrawing the generator as soon as a pulse has been injected in each loop. Now, the difference in time of arrival of pulses from each loop at the respective terminals 70, 71 and therefore at the inputs of start stop counter 85 would evidently change if the accelerometer's velocity is changed. Since start stop counter 85 is assumed to be controlled by a clock oscillator 86, its display will provide an integrated reading of that acceleration, and will be proportional to velocity change. It will be apparent that amplifiers 60, 60a may be provided in this arrangement with conventional input threshold circuits so that undesired noise signals would not be regenerated.

It will readily be apparent that the pulses of the two loops would not generally be in exact space synchronization in traversing the paths represented by surfaces 10, 10a. Accordingly, there would generally be no interaction between pulses in the two loops and thus no possibility of mode locking effects. However, the two circulating pulses can, on occasion, travel these paths in space synchronous juxtaposition with a consequence of interaction. Such interaction may be reduced by a further order by interchanging the positions of exciter 15 and receiver 14 on one side only of the flexure member 11.

FIG. 8 illustrates a preferred pulse system in which undesired interactions are substantially eliminated. The flexure element 11 of the device of FIG. 8 and its associated elements are similar to those of FIG. 6. Corresponding parts of the transducer arrangement therefore have corresponding reference numbers.

In FIG. 8, the receiver elements 14, 14a associated with the respective surface paths 10, 10a are coupled to inputs of a conventional summation circuit 90, the output of which is amplified by a broad band pulse amplifier 89. The pulse output of amplifier 89 is used in several ways. If switch 91 is in its conducting state, the pulse will be coupled to terminal 19 and thence to exciter 15 to cause an acoustic pulse to propagate at surface 10 into receiver 14. If switch 92 is in its conducting state, the pulse will be coupled to terminal 19a and then to exciter 15a to cause an acoustic pulse to flow at surface 10a into receiver 14a. The pulse signals from amplifier 89 are also used to control the state of a conventional triggered flip flop 93.

The Q output of conventional triggered flip flop 93 is used to control the conductivity state of switch 91, while the $\bar{Q}$ output of flip flop 93 similarly controls the state of conductivity of switch 92. Both of the Q and $\bar{Q}$ outputs operate a conventional up-down counter 96 additionally controlled in the usual manner by clock oscillator 97. The output of up-down counter 96 may be displayed in a conventional display integral with it or may be supplied to utilization device 98.

To understand in further detail the operation of the embodiment of FIG. 8, consider that the surface wave paths 10 and 10a represent respective delays $T_1$ and $T_2$, $T_1$ being smaller than $T_2$ because of acceleration, for example. Assume that a representative pulse arrives at receiver 14 at a particular time. At some later time $t_o$, because of delays inherent in sum circuit 90 and pulse amplifier 89, the same pulse arrives at the input of flip flop 93. Assume also that it passes through the conducting switch 92 to exciter 15a, arriving there at time $t_o + t_{s92}$, $t_{s92}$ being the delay experienced in switch 92. Since switch 92 is conducting at time $t_o$, switch 91 is not conducting because of the activity of flip flop 93; thus, exciter 15 will not be excited at that moment. Flip flop 93 is arranged in a conventional manner to change its state at some point in time after $t_o$, reversing the conductivity states of switches 91 and 92.

The pulse which has been conducted through switch 92 therefore arrives at receiver 14a later than it started from receiver 14 by a time $T_2 + t_o + t_{s92}$. That pulse now propagates through sum circuit 90 and pulse amplifier 89 only to arrive at exciter 15 at the even later time $T_2 + 2t_o + t_{s91} + t_{s92}$. Flip flop 93 again changes state. The pulse completes a first total cycle by arriving at receiver 14 at time $T_1 + T_2 + 2t_o + t_{s92} + t_{s91}$. Then the program cyclically repeats in a self-sustaining fashion.

The acceleration or strain which flexure member 11 experiences may now be displayed directly or in terms of velocity change by the up-down counter 96 which counts up cycles of the clock oscillator 97 output while flip flop 93 is in one state, and counts down while flip flop 93 is in its second state. The accumulated count displayed at the end of each measure-period displayed by counter 96 or supplied to utilization device 98 is $t_{s91}+T_1+t_o-(t_{s92}+T_2+t_o)$ or $T_1-T_2+t_{s91}-t_{s92}$, a quantity that is independent of $t_o$, a feature of the arrangement being that the relatively unstable delay $t_o$ cancelled itself in the signal processing system. While errors may be contributed by delays of other elements, these errors are due only to differences in delays of similar devices, such as the differences in delays of switches 91 and 92 and the like. However, it is well within the capability of the art to minimize such difference errors by careful selection of matched components and by other known techniques. In addition, the special feature of the embodiment of FIG. 8 lies in the fact that there never are pulses propagating at the same time on the two opposed surfaces 10, 10a of the flexure member 11, and there can therefore be no possibility of mode locking or of undesirable cross-coupling effects.

It will be understood by those skilled in the art that the invention may be employed as an accelerometer device for operating displays or for providing velocity or acceleration proportional electrical signals to other utilization equipment, such as to integrators for producing position or velocity data. While the seismic mass 13 in FIGS. 1 and 2 is shown as a seismic mass for use with the device as an accelerometer, the device may also be used as in FIG. 9 to derive an electrical control signal proportional to the amplitude of any parameter susceptible of being converted into lineal motion or force, such as of a rod 100 seated in end piece 101 in bearing 102. Thus, deflection of a pressure diaphragm may be converted into translation of rod 100 for flexing cantilever 11, as before. The invention may be used with flexible elements other than cantilevers clamped at one end, such as on the active surface of a flexible diaphragm clamped at its peripheral edge in a pressure cavity or vessel for measurement of a varying pressure therein.

It will be understood by those skilled in the art that the physical geometries and dimensions suggested by the several figures are generally representative, but that the figures are proportioned for the purpose of clearly illustrating the principles of the invention in its various embodiments, and do not in themselves necessarily represent proportions or dimensions which would be used in actual practice.

It is seen that the invention is a sonic transducer device and signal processing system employing surface acoustic waves that is adapted to use in the measurement of acceleration, force, strain, or related parameters. Relative changes in propagation velocity of Rayleigh waves flowing at paired flexed surfaces may be measured in an arrangement which is compact, light, accurate, and reliable. Inherently, the novel transducer in its several embodiments is highly sensitive, though relatively immune to ambient conditions. The transducers have little zero drift or scale factor drift, or sensitivity to temperature, humidity, or power supply variations. In the several embodiments of the invention comprising times of transit along paired paths, maximum freedom from prior art defects is offered, as well as freedom from mode locking and other spurious coupling effects found disadvantageous in certain applications of prior art apparatus. The novel transducers may be used to measure acceleration or as strain or displacement gauges and, since they provide a frequency or digital output, they avoid noise and drift problems inherent in purely analog devices and are easily interfaced with digital signal processors.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. Transducer means comprising:
    flexure means having first and second opposed flexible surface layer means for separately propagating respective acoustic waves along first and second respective predetermined paths therein,
    first and second exciter means for exciting and propagating said respective first and second acoustic waves along said respective predetermined paths,
    first and second receiver means along said respective predetermined paths for receiving and converting said acoustic waves into electric signals,
    first and second respective feed back means for coupling said first receiver means to one of said first exciter means and for coupling said second receiver means to second exciter means for forming respective first and second self-resonant closed loop circuit means oscillating at different respective first and second odd multiples of a predetermined frequency, and
    signal processor means jointly responsive to said first and second closed loop circuit means for deriving a measure of the flexure of said flexure means.

2. Apparatus as described in claim 1 wherein:
    said first feed back means couples said first receiver means to said first exciter means through first amplifier means, and
    said second feed back means couples said second receiver means to said second exciter means through second amplifier means.

3. Apparatus as described in claim 2 wherein said signal processor means comprises:
    first signal mixer means responsive to said first and second loop circuit means,
    divider means responsive to said first loop circuit means,
    second mixer means responsive to said first mixer means and to said divider means, and
    utilization means responsive to said second mixer means.

4. Apparatus as described in claim 3 wherein:
    said first signal mixer means comprises first and second quadrature mixer means, and
    said second mixer means comprises third and fourth mixer means respectively responsive to said first and second quadrature means.

5. Apparatus as described in claim 3 wherein said utilization means comprises indicator means for displaying acceleration.

6. Apparatus as described in claim 3 wherein said utilization means comprises indicator means for displaying velocity.

7. Apparatus as described in claim 1 wherein said first and second opposed flexible surface layer means are oriented with respect to the predetermined flexure direction of said flexure means so as to be stressed in opposite senses for a predetermined sense of flexure of said flexure means.

8. Transducer means comprising:
    flexure means having first and second opposed flexible surface layer means for separately propagating respective acoustic waves along first and second respective predetermined paths therein,
    first and second exciter means for exciting and propagating said respective first and second acoustic waves along said respective predetermined paths,
    first and second receiver means along said respective predetermined paths for receiving and converting said acoustic waves into electric signals,
    first and second respective feed back means for alternately coupling said first receiver means to said second exciter means and said second receiver means to said first exciter means for alternately forming respective first and second closed loop circuit means, and
    signal processor means jointly responsive to said first and second closed loop circuit means for deriving a measure of the flexure of said flexure means.

9. Apparatus as described in claim 8 wherein:
    said first feed back means couples said first receiver means to said second exciter means through common amplifier means in a first time period, and
    said second feed back means couples said second receiver means to said first exciter means through said common amplifier means in a second time interval succeeding said first time interval.

10. Apparatus as described in claim 8 wherein said first and second feed back means have in common series circuit means comprising:
    summation circuit means responsive to said first and second receiver means, and
    pulse amplifier means responsive to said summation circuit means.

11. Apparatus as described in claim 10 including switch means for cyclically coupling the output of said pulse amplifier means to said second exciter means and then to said first exciter means.

12. Apparatus as described in claim 11 wherein said signal processor means comprises:
    bistable circuit means responsive to said pulse amplifier means for cyclically controlling said switch means, and
    utilization means responsive to said bistable circuit means.

13. Apparatus as described in claim 12 wherein said utilization means comprises indicator means for displaying acceleration.

14. Apparatus as described in claim 12 wherein said utilization means comprises indicator means for displaying velocity.

15. Apparatus as described in claim 8 wherein said first and second opposed flexible surface layer means are oriented with respect to the predetermined flexure direction so as to be stressed in opposite senses for a predetermined sense of flexure of said flexure means.

* * * * *